J. F. RADERS.
AUTOMATIC PHOTOGRAPHING MACHINE.
APPLICATION FILED MAR. 16, 1908.

931,485.

Patented Aug. 17, 1909.

WITNESSES:

INVENTOR,
Joseph F. Raders,
BY
HIS ATTORNEY.

Fig. 4.

J. F. RADERS.
AUTOMATIC PHOTOGRAPHING MACHINE.
APPLICATION FILED MAR. 16, 1908.

931,485.

Patented Aug. 17, 1909.
6 SHEETS—SHEET 4.

Fig. 5.

WITNESSES:

INVENTOR,
Joseph F. Raders,
BY
HIS ATTORNEY.

J. F. RADERS.
AUTOMATIC PHOTOGRAPHING MACHINE.
APPLICATION FILED MAR. 16, 1908.

931,485.

Patented Aug. 17, 1909.
6 SHEETS—SHEET 5.

WITNESSES:
R. W. Pittman
David Feld

INVENTOR,
Joseph F. Raders,
BY
HIS ATTORNEY.

J. F. RADERS.
AUTOMATIC PHOTOGRAPHING MACHINE.
APPLICATION FILED MAR. 16, 1908.

931,485.

Patented Aug. 17, 1909.
6 SHEETS—SHEET 6.

WITNESSES:
R. W. Pittman
David Feld

INVENTOR,
Joseph F. Raders,
BY
Pierson L. Mills,
HIS ATTORNEY.

UNITED STATES PATENT OFFICE.

JOSEPH F. RADERS, OF NEW YORK, N. Y., ASSIGNOR, BY MESNE ASSIGNMENTS, OF FIVE-EIGHTHS TO JOHN L. PHILLIPS AND SAMUEL H. WEIL, OF NEW YORK, N. Y.

AUTOMATIC PHOTOGRAPHING-MACHINE.

No. 931,485.     Specification of Letters Patent.     Patented Aug. 17, 1909.

Application filed March 16, 1908. Serial No. 421,513.

*To all whom it may concern:*

Be it known that I, JOSEPH F. RADERS, a resident of the borough of Manhattan, city and State of New York, have invented a new and useful Improvement in Automatic Photographing-Machines, of which the following is a specification.

This invention embraces an apparatus of the coin-controlled class and is directed to the production of a simple, power-operated mechanism for delivering a sensitized plate from a magazine, exposing such plate, subjecting the exposed plate to the action of suitable developing and fixing solutions, washing the fixed plate and thereafter causing the washed plate to pass to the exterior of the apparatus, all of those actions being automatically controlled and executed.

In the drawings accompanying the present specification.

Similar characters of reference designate corresponding parts in all figures.

Figures 8, 9:
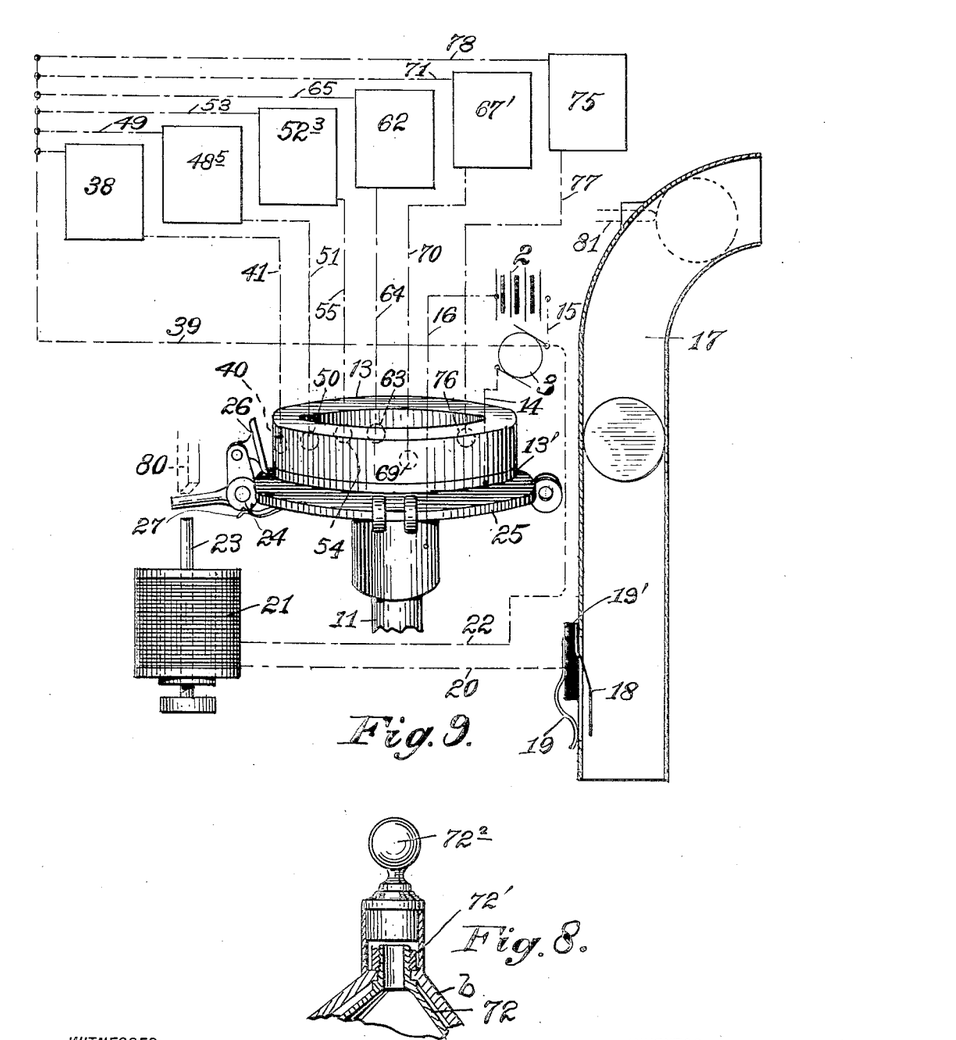
Fig. 8 is a detail of the water tank fastening.
Fig. 9 is partly an elevation, partly a diagrammatic view, illustrating certain electrical connections.

Electricity is the motive power adopted in this instance for the actuation and control of the mechanism, a convenient source thereof consisting of a storage battery 2, indicated in the diagrammatic view Fig. 9. Current from this serves to drive a motor 3 supported on proper framework 4 within a suitable and desired machine casing 5. A worm 6 on the armature shaft of this motor imparts an oscillating motion to a pawl carrier 7 through a reducing train comprising a worm wheel 8, a gear 8′ rigid therewith and meshing with gear $8^2$, a crank pin $8^3$ on the latter, and a connecting link $8^4$. Mounted on the oscillating carrier 7 is a spring-pressed pawl 9 adapted to engage with a ratchet wheel 10 rigid with a shaft 11, this latter therefore having an intermittent rotating motion during the running of the motor, reverse motion being precluded by a spring-pressed retaining pawl 12.

It should be here stated that in the present machine, as here organized, shaft 11 has four periods of dwell during each complete rotation, the first corresponding to that in which the machine is at rest, the plate last finished having passed from the machine and the latter being in condition for the exposure of a new plate; the second dwell period is that in which the exposed plate has been brought to the position for its development; the third period is that in which the developed image is fixed; the fourth is that in which the plate is washed; and the next dwell period is that first mentioned in which the washed plate is delivered from the machine. The various actions, moreover, are effected through the actuation of suitable electro-magnetic mechanisms the circuits to which are readily controlled from rotating shaft 11 in the following manner; that is to say, rigid with the framework of the machine is an annular block 13 of insulating material concentric with shaft 11 and supporting a metallic ring 13′ insulated from the frame of the machine and whose exterior annular surface as well as that of block 13 constitutes a rubbing face for one or more contact shoes presently described. One side of motor 3 is connected to ring 13′ as by wire 14, see Fig. 9 and the other side of the motor is connected to one side of battery 2 by wire 15; the other side of the battery is grounded to the machine, see wire 16.

A coin chute 17 opens out through a suitable aperture 17′ to the exterior of the casing while in the path of the descending coin is a spring 18 which when the inserted coin is one of the proper denomination, that is diameter, is pressed in to contact with a spring finger 19 supported on an insulating piece 19′. Finger 19 is connected by wire 20 with one end of the coil of an electro-magnet 21 (it may be double as shown) the opposite end of which coil is connected by wire 22 with the motor-to-battery side of the latter. The result is that as the coin deflects spring 18, a momentary current traverses the coil of magnet 21, its guided spring-retracted core 23 is raised, and impinges against one arm of an angle lever 24 pivotally mounted on a plate 25 rigid with shaft 11. A pivoted shoe 26 on the angle lever is thereby pressed against the surface of block 13 and ring 13′, closing the battery circuit through motor 3 which thereupon commences to rotate. Shoe 26 is kept pressed against the aforesaid rubbing face after the passage of the coin and the descent of core 23 in consequence, by a spring-pressed detent 27, while the stopping of shaft 11 in a position assuring the coöperation of core 23 and angle lever 24, is effected by means presently described. Assuming shaft 11 to have commenced its intermittent rotation, plate controlling mechanism now comes into operation.

The magazine for the sensitized plates comprises an inner and an outer shell 28, 28′, respectively connected by radial partitions $28^2$ forming pockets each adapted to hold a plate. The magazine is mounted to rotate about the axis of a journal formed on a cap 29 fitted to the squared end of a post 30 secured to a bottom plate 31 attached to the machine frame, the journal bearing being in a cross plate 32 connected to the upper edge of the inner shell 28. A coiled spring 33 one of whose ends is affixed to cap 29 and whose other end is secured to a drum 33′ extending from cross plate 32 tends to rotate the magazine in one direction. This motion is under the control of a magnetically operated escapement device comprising a double toothed pawl 34 pivoted to a bracket 34′ on plate 31 and connected by a link $34^2$ with a pivoted spring-retracted armature lever $34^3$ mounted on a bracket $34^4$. A series of teeth 35 on the magazine are of such dimensions and so related to pawl 34 that each full forward and backward swing of the latter enables spring 33 to shift the magazine a distance equal to the width of a plate pocket of the magazine. The pockets are thus brought successively over a slot 36 in plate 31 and the sensitized plate in the slot-alining pocket permitted to descend through a chute 37 by which it is caused to turn through ninety degrees about a vertical axis in which position it comes to rest opposite the lens tube.

Figure 1:
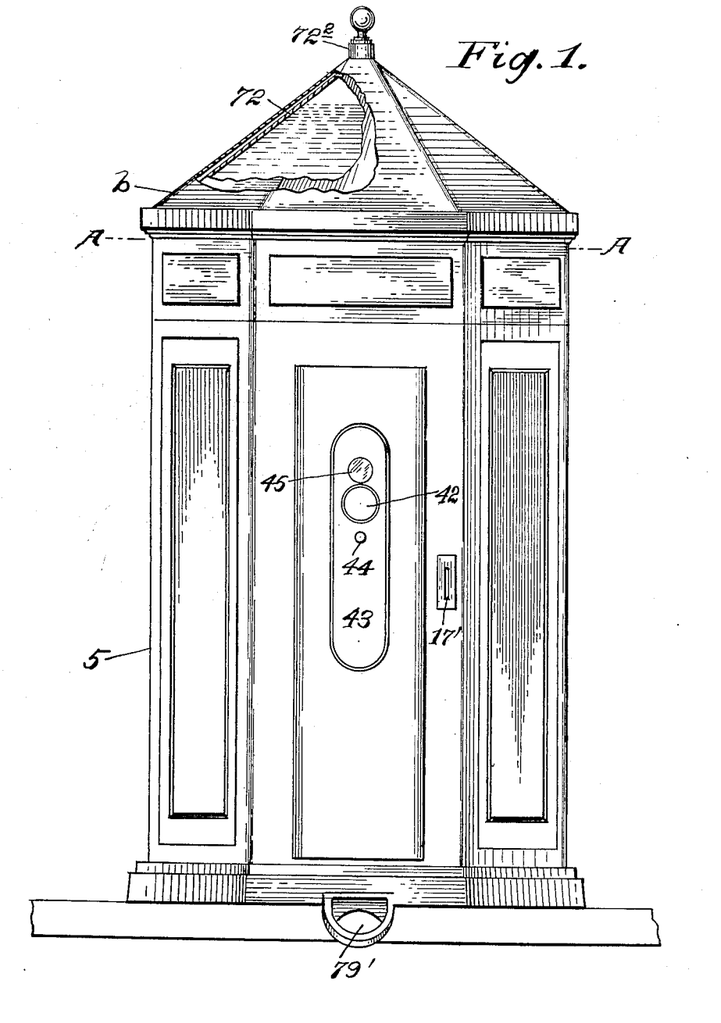
Figure 1 is an elevation of an automatic photographing machine embodying my present invention, part being broken away.
Figure 2:
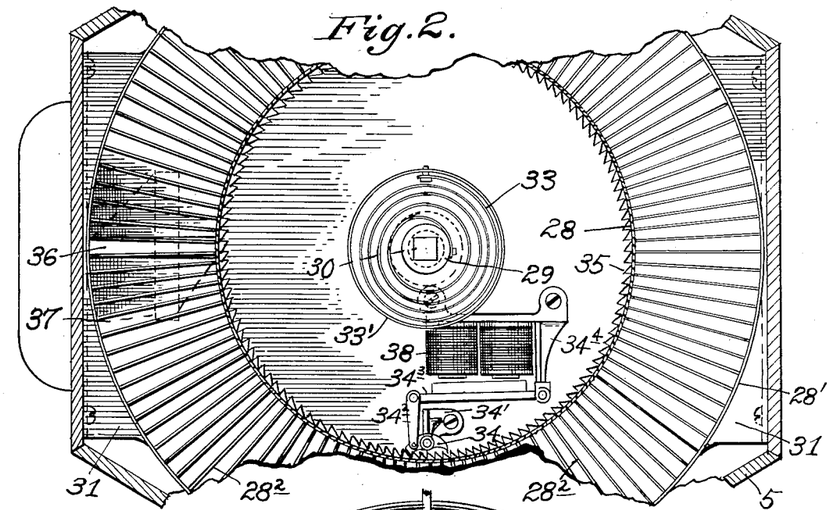
Fig. 2 is a sectional plan on the plane of the line A—A in Fig. 1, part being broken away and the upper plate of the magazine being removed.
Figure 3:
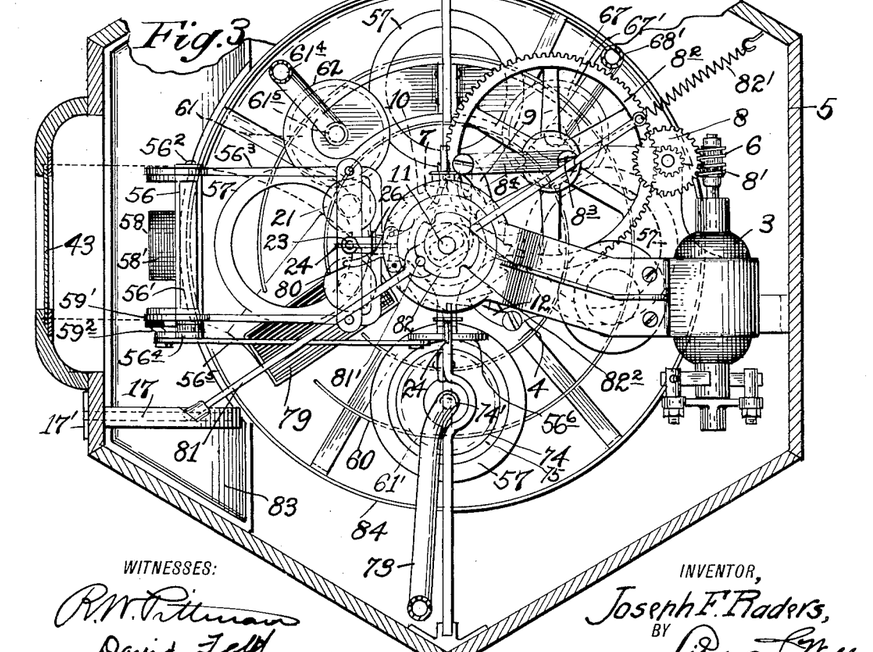
Fig. 3 is a horizontal cross section showing the plate carriers and associated mechanism; the tanks for the developing and fixing solution as well as certain other parts are omitted for the sake of clearness.
Figure 4:
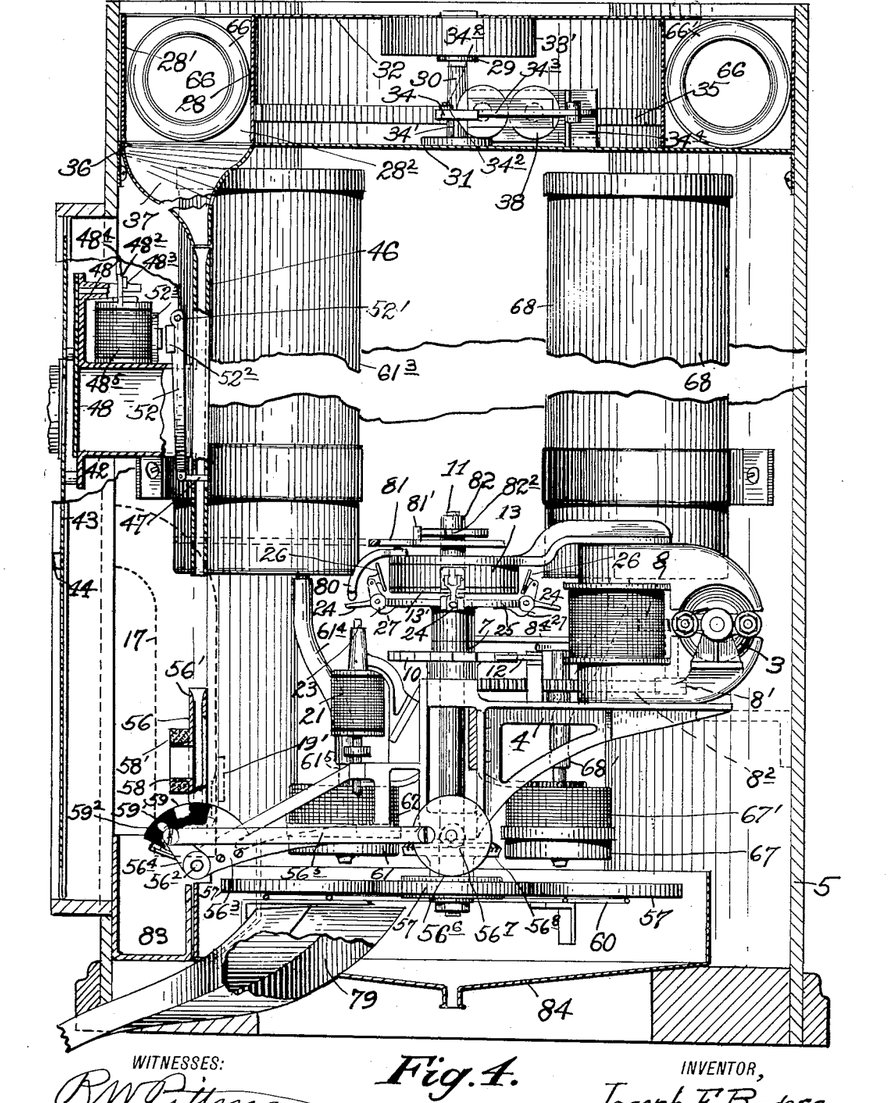
Fig. 4 is a vertical section, the plane of the section coinciding with the lens tube axis, certain parts being in elevation and a portion intermediate the top and bottom of the apparatus being removed.

Reverting to the escapement device it should be stated that one end of the coil of electromagnet 38 thereof is connected to one side of battery 2 see wire 39, Fig. 9, while the other end of the coil is connected to a contact piece 40 on ring 13, see wire 41, in a position such that the set shoe 26 comes in contact therewith immediately after the beginning of the rotation of shaft 11 thereby momentarily actuating the escapement device and causing the descent of a fresh plate from the magazine. At the front of the machine is the lens tube 42 which is preferably mounted upon a slide 43 vertically adjustable and adapted to be held (as by friction) in the position to which it has been shifted by the person about to use the machine in bringing the lens tube opposite his face. This adjustment is facilitated by a finger piece 44 and a mirror 45 both on the slide. A plate having descended from the magazine into chute 37 and having been turned, as aforesaid, passes into a guide 46 coming to rest upon a pin 47 adapted to be withdrawn from its stop position, in which it is shown in Fig. 4, and in which the plate is held in proper alinement with the lens tube.

To the pivot shaft 48′ of a shutter 48 mounted upon the lens tube is secured an arm $48^2$ which has a pin and slot connection $48^3$ with a spring-retracted pivoted armature lever $48^4$ properly related to a suitable electromagnet $48^5$. One end of the coil of this magnet is connected to one side of battery 2, see wires 49, 39 and 15, while the other end of the coil is conducted to a contact piece 50 on ring 13, see wire 51, whose position is such that set shoe 26 will come into engagement with it after leaving contact piece 40 and before the second dwell period of shaft 11 occurs.

Stop pin 47 extends from a rock lever 52 affixed to a rock shaft 52′ which carries the spring retracted armature $52^2$ of an electric magnet $52^3$ one end of whose coil is connected to one side of battery 2, see wires 53, 39 and 15, and whose other end is connected to a contact piece 54 on ring 13 by wire 55 in a position such that set shoe 26 will come into engagement with it after leaving contact piece 50 and before the second dwell period of shaft 11 occurs.

The plate having been exposed and released by the momentary actuation of magnets $48^5$ and $52^3$ descends through the continuation of guide 46 into a plate transferrer by which the exposed plate is deposited in a plate carrier which in turn conveys the plate to consecutive positions in which it is acted upon by the developing and the fixing solutions, then washed and finally ejected. During these actions of developing, fixing and washing as well as ejecting the finished plate, shaft 11 is temporarily at rest, pawl 9 then retracting or the machine having stopped with the parts in a position corresponding to one of these dwell periods.

As the machine is here organized, I have placed four sets of contact pieces 40, 50 and 54 around the ring 13 and mounted upon plate 25 four angle levers 24 each with its shoe 26, so correlating the parts that during each dwell period an angle lever will be in position to be actuated as aforesaid by the core 25 of magnet 21. Even though a complete rotation of shaft 11 is necessary to complete and eject a finished plate, a second, third and fourth coin may therefore be inserted and a corresponding number of exposures made before the first plate is ejected, shaft 11 continuing its motion until the shoe last set comes again over core 23 when it is withdrawn by means that will be presently explained.

Referring now to the plate transferrer designated by 56 the same is here mounted to swing from a vertical position in which its plate-receiving opening 56' is in line with guide 46 to a substantially horizontal position the opening 56' into the transferrer being in line with the aforesaid guide during each dwell period of shaft 11 ready to receive an exposed plate as already explained. That is to say shaft $56^2$ of the plate transferrer is mounted in a supplemental frame $56^3$ and a crank $56^4$ thereon is connected by a link $56^5$ with a crank disk $56^6$ a bevel gear $56^7$ on the suitably journaled shaft of which meshes with a gear $56^8$ of four times the diameter on the shaft 11. Plate transferrer 56 thus makes four complete reciprocations for each full turn of shaft 11, the parts being so related that during each dwell period of shaft 11, crank disk $56^6$ is on a dead center and the plate transferrer is in a vertical position ready to receive a plate which has been released from the magazine, exposed, and permitted to descend as already explained. During the downward swing of the plate transferrer and as shaft 11 starts in motion from a dwell period the exposed plate in the transferrer is prevented from dropping out of the open back thereof until one of a series of four plate carriers 57 rigid with shaft 11 reaches a position in the plane of reciprocation of the transferrer, whereupon the plate is released, drops into the moving carrier and is by it moved to the plate-developing position corresponding to that in which, as already explained, shaft 11 comes to rest.

For the purpose of holding the plate in the transferrer, the latter is provided with an extension 58 around which is wound a magnet coil 58' one of whose ends is connected to the motor-to-battery side of the latter by a suitable wire (not shown) while the other end of the coil is connected to a metallic contact piece 59 secured to a segment 59' of insulating material by a wire (not shown). The position of this contact piece is such that during the rest position of crank $56^4$, spring finger $59^2$ on the latter is out of engagement therewith but as the crank moves forward the finger comes into engagement with the piece, the circuit through coil 58' is closed and the plate electromagnetically retained in the transferrer. Just before the latter reaches its full downward position, the spring finger moves out of engagement with the contact piece, the circuit is opened, and the plate drops into the carrier as already explained. Each carrier 57 is ring-like in form the inner periphery being adapted to engage with the edge of the plate and slide the latter, sensitized face upward along a lower fixed slide way 60.

Figure 5:
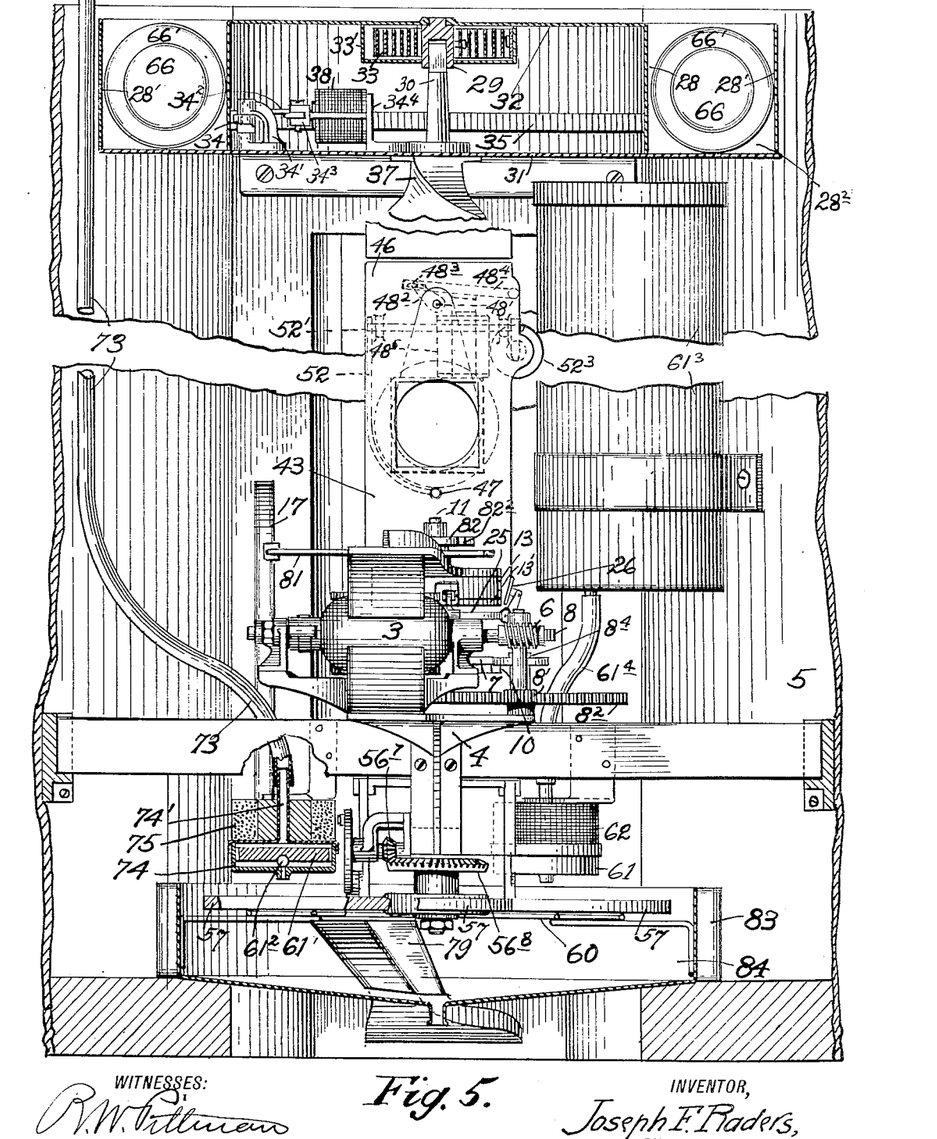
Fig. 5 is an elevation looking from the right toward the left in Fig. 3, the water valve mechanism being in section and a part intermediate the top and bottom of the machine being removed.
Figures 6, 7:
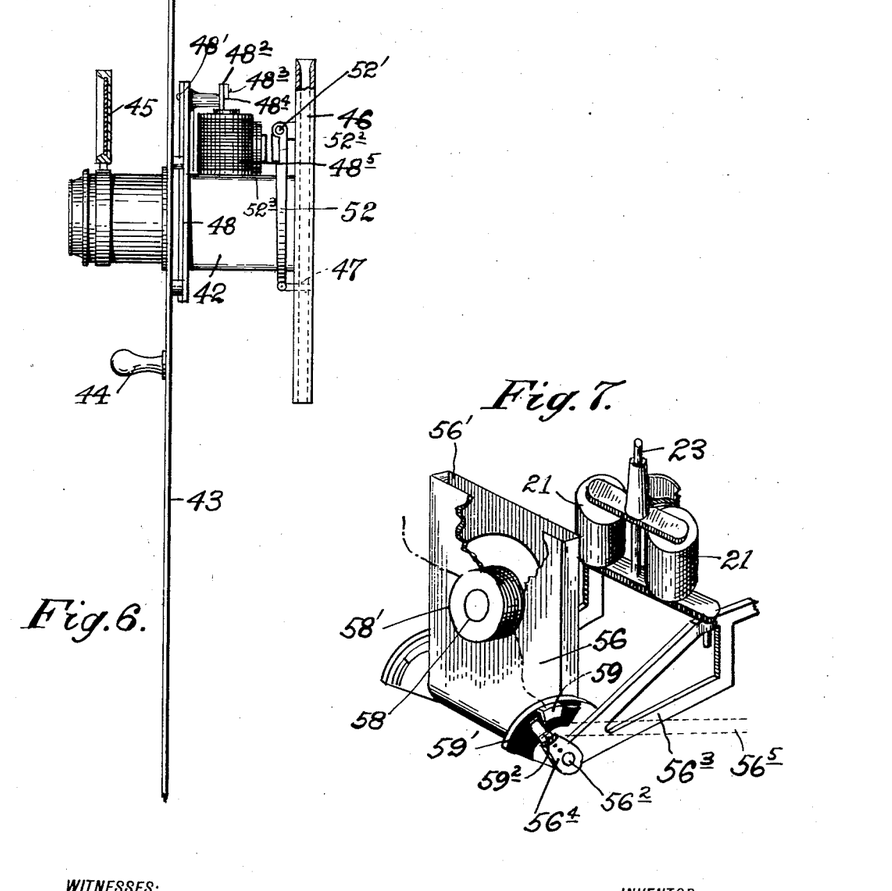
Fig. 6 is a detail, partly in section, partly in elevation, showing the vertically adjustable lens tube and associated parts.
Fig. 7 is a perspective detail of the swinging plate transferrer and correlated parts.

The plate having been moved by the carrier from the point where it has entered the carrier to a position corresponding to the next stop position of shaft 11, a quantity of developing solution is allowed to drop thereon. For this purpose I have shown an electro-magnetically operated valve, the construction here comprising a valve casing 61 of suitable inert, non-corrosive material as rubber. In this casing works an armature 61' (see the section of the water valve mechanism in Fig. 5) covered with similar material and carrying a valve $61^2$ for controlling the discharge onto the plate below of developing solution entering from a tank $61^3$ thereof secured to the machine casing and connecting by a pipe $61^4$ with the inlet $61^5$ to the valve casing. Inlet $61^5$ passes through the core of an electromagnet 62 one end of whose coil is connected to a contact piece 63 on ring 13 by a wire 64 while the opposite end is connected to the ungrounded side of battery 2, see wires 65, 39 and 15. Just before shaft 11 reaches its aforesaid stop position the set shoe 26 comes into engagement with contact piece 63, thereby closing the circuit through coil of electro magnet 62, and raising valve $61^2$. Developing solution now drops upon the plate as long as shaft 11 remains stationary. When this shaft resumes its motion, electromagnet 62 is deënergized and valve $61^2$ closes by gravity. In order to facilitate the action of the fluids on the plate, each of the latter designated by 66 may be provided with a raised annular finishing rim 66' forming a shallow cup when the article is in a horizontal position.

From the developing position the plate is carried under the valve controlling the egress of the fixing solution, in which position shaft 11 again comes to rest. The construction and mode of operation may be as before. Suffice it to say that 67 is the fixing solution valve casing, 67' its electromagnet, 68 the tank, 68' the connecting pipe, 69 the contact piece, 70 and 71 the connecting wires. The next partial turn of shaft 11 carries the plate from the plate fixing solution to the position for the washing thereof, whereupon shaft 11 again comes to rest as before. A conical water tank 72 is represented, it being secured in the conical head $b$ of the machine casing by a nut 72' and the conical head being capped by a stopper finial $72^2$. Water tank 72 connects by a pipe 73 with an electromagnetic valve mechanism which may be similar to that already described. Suffice it to say that the casing 74 thereof is indicated as well as its inlet 74' and its electromagnet 75, contact piece 76 and connecting wires 77 and 78 in Fig. 9. During the last portion of the full movement of shaft 11, the washed plate is pushed off the end of slide way 60 whereupon it descends through a chute 79 into a pocket 79' on the exterior of the machine casing. The final stage of the turning motion of shaft 11 carries the angle lever 24 of set shoe 26 into engagement with a cam 80 by which the shoe is withdrawn from its circuit closing position and shaft 11 comes to rest with the angle lever in position to be again acted upon by core 23 of magnet 21.

In order to preclude the passage of a coin down the coin chute 17 and past the circuit closing springs 18 and 19 except during the dwell periods of shaft 11, only at which times, it will be understood, is there an angle lever 24 in coöperative relation with core 23, I have shown a slide bar 81 a pin 81' on which is urged against a notched disk 82 on shaft 11 by a spring 82'. Disk 82 is provided with four notches $82^2$ in such position and relation that whenever shaft 11 is at rest pin 81' is seated in a notch and the end of bar 81 is withdrawn from the path of a coin; when, however, shaft 11 is in motion the pin rides out of the notch and the end of the bar is shifted across said path. The coins are received in a suitable holder 83 while a drip pin 84 may as shown be located under the mechanism.

Constructed in the foregoing manner, the operation of the machine may be briefly described as follows: Assuming that the person about to be photographed has vertically adjusted the lens tube 42 and inserted a proper coin in chute 17, the deflection of spring 18 caused thereby closes the circuit through the coil of electromagnet 21, raises its core 23 and sets the particular shoe 26 in alinement with the latter. The motor circuit is thus closed and shaft 11 begins to rotate, the shoe comes into engagement with contact piece 40, pawl 34 is actuated and a plate descends onto pin 47. The continued movement of shaft 11 successively effects the opening and closing of shutter 48 and the withdrawal of pin 47 whereupon the plate descends into transferrer 56. Soon after this latter begins its backward swing through its crank connection with shaft 11, the circuit through magnet coil 58' is closed and the plate magnetically held until it is brought to a substantially horizontal position above a revolving plate carrier 57 whereupon the circuit is broken and the plate drops therein and is by it slid along way 60 to the developing position. Just before the parts take such position with shaft 11 momentarily at rest, electromagnet 62 is actuated and developing solution descends onto the plate in the carrier during the backward stroke of pawl carrier 7. When the shaft 11 resumes its forward rotary movement the descent of the developing solution is shut off. The plate is thereupon moved to its fixing position.

The sequential operation of the mechanisms for fixing and washing the plate will be readily understood from what has already been explained.

During the final partial rotation of shaft 11, the finished plate reaches the end of way 60 and passes to the exterior, while the set shoe is withdrawn from its circuit closing position by cam 80 and the parts come to rest ready to be again set in motion by a coin. The insertion of a coin at any time except when shaft 11 is at rest is precluded as aforesaid by the coöperation of slide bar 81 and notched disk 82; at any of these periods a coin may be introduced and a plate exposed and started through the steps involved in its necessary treatment.

Having described my invention, I claim:

1. In an automatic photographing machine, the combination of a plurality of plate carriers intermittently movable in unison, a plate transferrer adapted to receive an exposed plate and timed to deliver it to one of said carriers during the movement of the latter, means for locking the machine against the entrance of a coin during the time that said transferrer is out of its plate receiving position, and means for developing, fixing and washing the exposed plate in a carrier.

2. In an automatic photographing machine the combination of a plate carrier adapted to have an intermittent revolving motion about an axis, a plate magazine, a plate transferrer, means adapted upon the insertion of a coin to discharge a plate from the magazine, expose the same and pass the exposed plate into said transferrer, means for discharging the exposed plate from the transferrer into said carrier, and valve mechanisms for thereafter discharging a quantity of developing solution onto the plate in said carrier, then a quantity of fixing solution and finally water during successive dwell periods of said carrier.

3. An automatic photographing machine comprising in combination a revolving plate carrier, means for revolving the same through a complete revolution during which the carrier has four periods of dwell, means for transferring an exposed plate to the carrier during the movement from the first to the second dwell period, valve mechanisms for discharging developing solution, fixing solution, and water onto the plate in the carrier during the second, third and fourth dwell periods respectively, and means for discharging the finished plate from the carrier during the movement of the carrier from its fourth to its first dwell period.

4. The combination of an electric motor, a source of electric energy, a plate carrier shaft, mechanism interposed between said motor and said shaft for imparting an intermittent rotary motion to the latter, a plate magazine, a stop for holding a plate during exposure, electromagnetic mechanisms for controlling the actuation of said motor, magazine and stop, a plate transferrer adapted to receive an exposed plate and transfer it to the carrier, and means for developing, fixing and washing the plate in the carrier during dwell periods of said shaft.

5. The combination of an electric motor, a source of electric energy, a plate carrier shaft adapted to have an intermittent rotary motion imparted to it by said motor, a ring of insulating material, electrical connections, a conducting ring associated with said ring of insulating material and included in said connections, a contact shoe, mounted on said shaft, an electromagnet adapted to be actuated by the insertion of a coin and thereby set said shoe, a plate magazine, a shutter, a plate stop, valve mechanisms for delivering developing solution, fixing solution and water onto a plate in the plate stop carrier, electromagnetic mechanisms for actuating said magazine, shutter, plate stop and valve mechanism, contact pieces on said ring of insulating material and electrically connected to said electromagnetic mechanisms, a throw-out device for the shoe, and a plate transferrer.

6. In an automatic photograph machine a rotary shaft, electrical connections, a settable shoe, a ring of insulating material, and a plurality of sets of contact pieces on said ring substantially for the purpose set forth.

7. In an automatic photographing machine that combination with a plate carrier, of a swinging plate transferrer, electric connections for electromagnetically holding a plate in said transferrer until delivered thereby to said carrier, and means for making and breaking the electric circuit substantially for the purpose set forth.

In testimony whereof I have signed my name to this specification in the presence of two subscribing witnesses.

JOSEPH F. RADERS.

Witnesses:
J. R. FRITH, Jr.,
PIERSON L. WELLS.